April 24, 1928.

T. V. BUCKWALTER

CLOSURE FOR BEARINGS

Filed March 10, 1922

1,667,507

Inventor,
Tracy V. Buckwalter,

By Butler & Denny
Attorneys

Patented Apr. 24, 1928.

1,667,507

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

CLOSURE FOR BEARINGS.

Application filed March 10, 1922. Serial No. 542,616.

This invention is designed to provide simple, inexpensive and efficient means for closing a bearing to exclude foreign matter therefrom and retain a lubricant therein, and while of general utility is especially designed for use in the hub assembly described and claimed in my co-pending application, which has matured into Patent 1,437,833.

My improvements are characterized by a felt or similar washer held in the channel of a circular shell formed of two metal rings of angular cross section having circular parts of unequal width and diameter arranged in laminated relation with transverse webs suitably spaced to provide the sides of a channel for the washer, the composite ring thus formed having a laminated flange projecting laterally from said channel.

The improvements are further characterized by their adaptability for ready application to and in combination with hubs and spindles to effect the enclosure of the antifriction bearings disposed between them.

Figures 1, 2:
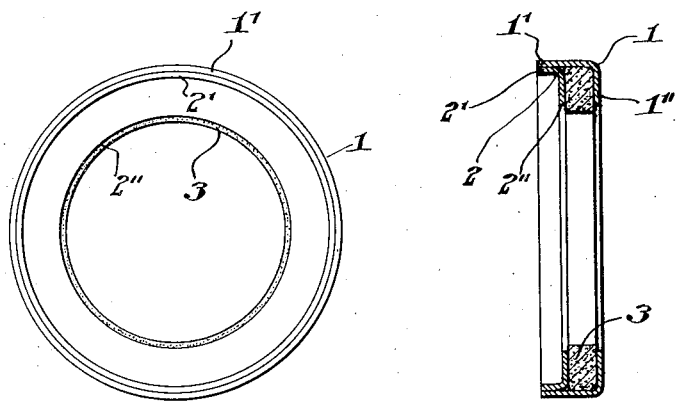

In the drawings, Fig. 1 is a side view of a device embodying my invention; Fig. 2 is a sectional view taken on a diameter thereof, and Fig. 3 is a broken sectional view illustrating the application of the device to a hub and spindle to effect the closure of the space between them.

The invention, in the form thereof illustrated, comprises the pressed metal ring 1 having the cylindrical periphery 1' with the web 1" extending inwardly from an edge thereof and the pressed metal ring 2 having the cylindrical periphery 2' (narrower than the periphery 1') with the web 2" extending inwardly from an edge thereof, the part 1' having an inner diameter substantially equal to the outer diameter of the part 2' so that such parts can be fixed together in laminated relation and form a cylindrical flange extending laterally from the channel formed by or between the parts 1" and 2", whose inner edges have equal diameters as shown.

A ring or washer 3, of suitable fibrous material such as felt, is held in the shell thus formed, between the parts 1" and 2", with its periphery bearing against the part 1', the inner diameter of this ring being smaller than that of the parts 1" and 2" so that it extends inwardly beyond them.

Figure 3:
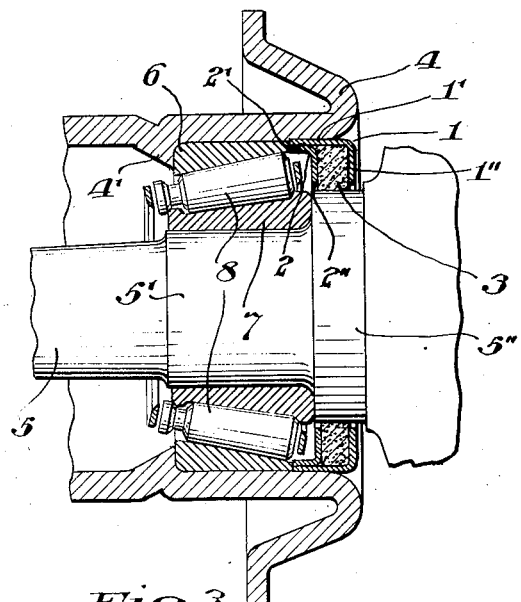

The closure thus formed is combined, as illustrated in Fig. 3, with a wheel hub 4 and a spindle 5 to effect the closure of the space between them; to exclude grit, dirt and other foreign matter and to obtain a lubricant.

The hub 4 has telescoped therein against the inwardly projecting flange 4' thereof, the cup 6, and the spindle 5 has telescoped on the section 5' thereof the cone 7 having its inner end abutting against the cylindrical shoulder 5" at the inner end of the spindle, the conical rollers 8 being disposed between the bearing elements 6 and 7.

The hub 4 has the closure telescoped therein, with the part 1' in frictional engagement therewith and the flange formed by the laminated parts 1' and 2' abutting against the cup 6, the felt washer or ring 3 making contact with the periphery of the part 5" which is passed therethrough in assembling the structure.

Having described my invention, I claim:

1. A device of the character described comprising a plurality of annular members of L-shaped cross section; a metal shell containing a circular channel and having a circular laminated flange extending laterally therefrom, the inner lamina of said shell being of less diameter throughout its width than the outer lamina of said shell, in combination with a ring of pliable fibrous material disposed in said channel and projecting beyond the same.

2. A device of the character described comprising a pressed metal shell of substantially uniform external diameter throughout its width composed of rings of L-shaped cross section having cylindrical parts of different widths fixed together in laminated relation to form a flange and webs projecting from edges of said parts to form a circular channel offset from said flange, in combination with a felt ring engaged in and projecting beyond said channel.

3. A device of the character described comprising a metal shell having a peripheral flange and containing a circular channel, said shell composed of pressed metal rings of angular cross sections having cylindrical parts of different widths fixed together to form said flange and webs projecting inwardly from edges of said parts to form said channel, and a felt washer disposed in and projecting inwardly beyond said channel, in combination with a hub, containing a bearing element, concentric with said flange and in which said shell is set with its flange engaging said element, a spindle extending through said washer in engagement therewith and disposed in said hub, said spindle having a bearing element thereon concentric with said element first named, and anti-friction devices between said elements.

4. In a device of the character described, a composite ring of substantially uniform diameter throughout its width, formed of parts of similar shape but different size having cross sections containing reentrant angles, said parts having concentric surfaces engaged in frictional relation and flanges extending therefrom providing a channel for a fibrous ring disposed in and extending beyond said channel.

In testimony whereof I have hereunto set my name this 6th day of March, 1922.

TRACY V. BUCKWALTER.